United States Patent

Tajima

(10) Patent No.: US 9,189,178 B2
(45) Date of Patent: Nov. 17, 2015

(54) IMAGE FORMING SYSTEM, IMAGE FORMING APPARATUS AND NON-TRANSITORY COMPUTER READABLE MEDIUM

(75) Inventor: Yukio Tajima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 26 days.

(21) Appl. No.: 13/445,381

(22) Filed: Apr. 12, 2012

(65) Prior Publication Data

US 2013/0088738 A1 Apr. 11, 2013

(30) Foreign Application Priority Data

Oct. 11, 2011 (JP) .................................. 2011-224327

(51) Int. Cl.
*G06K 15/00* (2006.01)
*G06F 3/12* (2006.01)
*H04N 1/00* (2006.01)

(52) U.S. Cl.
CPC ............ *G06F 3/1204* (2013.01); *G06F 3/1238* (2013.01); *G06F 3/1267* (2013.01); *G06F 3/1285* (2013.01); *G06F 3/1291* (2013.01); *G06F 3/1222* (2013.01)

(58) Field of Classification Search
CPC ............. H04N 1/00; H04N 1/21; H04N 1/60; H04N 5/77
See application file for complete search history.

(56) References Cited

U.S. PATENT DOCUMENTS

| 8,319,992 | B2 * | 11/2012 | Wei | 358/1.15 |
|---|---|---|---|---|
| 2004/0008373 | A1 * | 1/2004 | Yamamoto | 358/1.15 |
| 2006/0209343 | A1 * | 9/2006 | Wanda et al. | 358/1.15 |
| 2006/0274360 | A1 * | 12/2006 | Fukui et al. | 358/1.15 |
| 2006/0274365 | A1 * | 12/2006 | Tanimoto | 358/1.15 |
| 2009/0279117 | A1 * | 11/2009 | Kondo | 358/1.14 |
| 2010/0231931 | A1 * | 9/2010 | Tao | 358/1.6 |

FOREIGN PATENT DOCUMENTS

JP    A-2010-79510    4/2010

* cited by examiner

*Primary Examiner* — Cuong A Ngo
*Assistant Examiner* — Frantz Bataille
(74) *Attorney, Agent, or Firm* — Oliff PLC

(57) ABSTRACT

An image forming system includes plural image forming apparatuses that form images, and a second memory that stores user identification information for identifying a user and apparatus identification information for identifying an image forming apparatus storing image data corresponding to the user identification information so as to be correlated with each other, wherein each of the image forming apparatuses includes a first memory, a reception component, a first acquisition component, a second acquisition component, a storage controller, and an image forming component that forms an image corresponding to image data acquired by the first acquisition component or the second acquisition component.

4 Claims, 11 Drawing Sheets

FIG. 4

| USER ID | STORAGE DATE | FILE NAME | NUMBER OF PAGES | NUMBER OF COPIES |
|---|---|---|---|---|
| User01 | 2011//8/30 20:25 | MEMORANDUM.Txt | 1 SHEET | 1 COPY |
| User01 | 2011//8/30 20:30 | DRINKING PART.jpg | 1 SHEET | 1 COPY |
| User01 | 2011//8/30 20:31 | INTERVIEW MATERIAL.Txt | 10 SHEET | 2 COPIES |

| USER ID | PASSWORD | SPOOLER INFORMATION | |
| --- | --- | --- | --- |
| | | PRIMARY | SECONDARY |
| user01 | 1234 | 192.168.227.101 | — |
| user02 | 5678 | 192.168.227.102 | 192.168.227.103 |
| ... | ... | ... | ... |

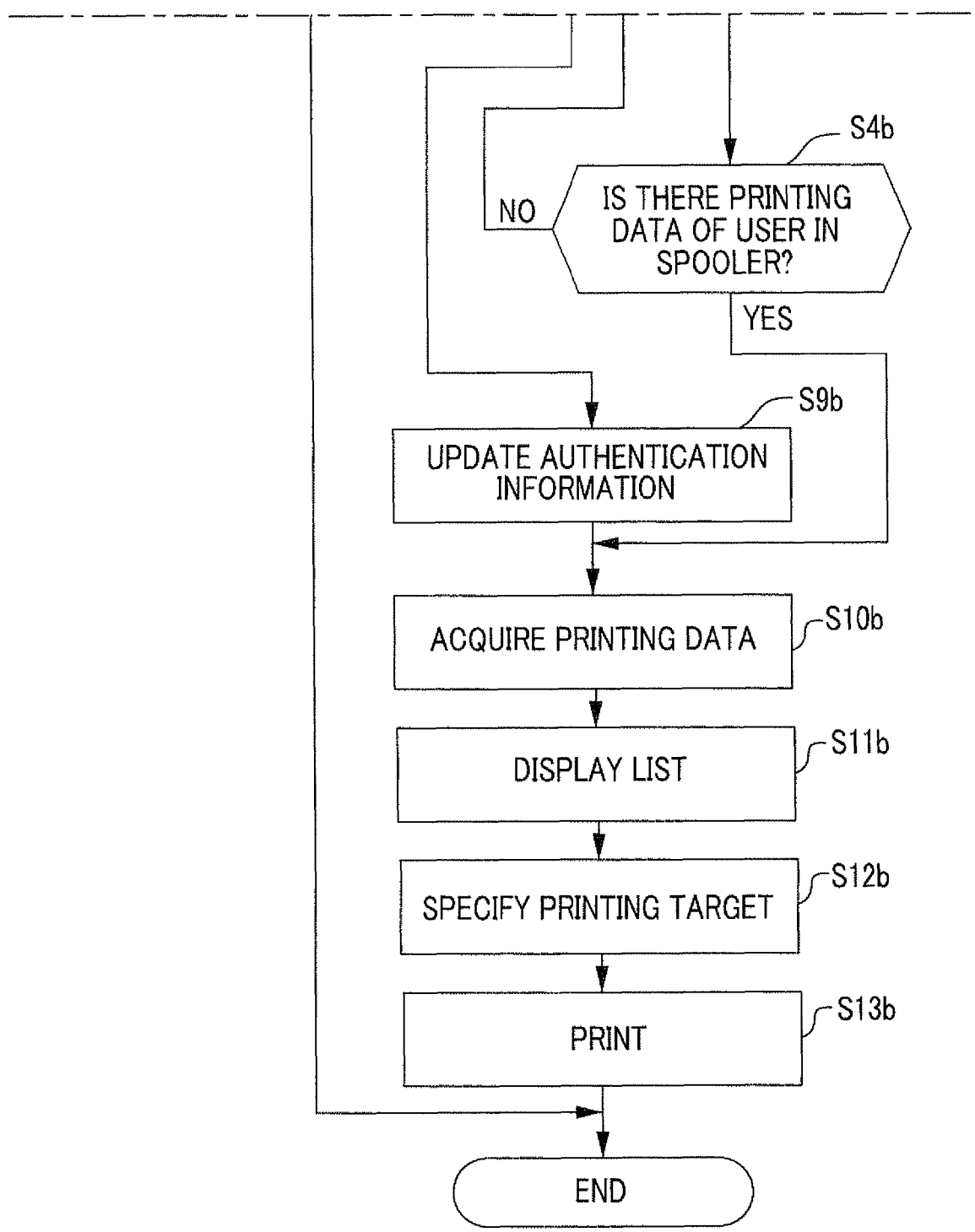

FIG. 10

| USER ID | PASSWORD | SPOOLER INFORMATION | |
| --- | --- | --- | --- |
| | | PRIMARY | SECONDARY |
| user01 | 1234 | 192.168.227.101 | 192.168.227.103 |
| user02 | 5678 | 192.168.227.102 | 192.168.227.103 |
| ... | ... | ... | ... |

321a

IMAGE FORMING SYSTEM, IMAGE FORMING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2011-224327 filed Oct. 11, 2011.

BACKGROUND (i) Technical Field

The present invention relates to an image forming system, an image forming apparatus and a non-transitory computer readable medium.

(ii) Related Art

A technique is known where an image designated by a user maybe formed using any image forming apparatus of plural image forming apparatuses connected to a network.

SUMMARY

According to an aspect of the invention, there is provided an image forming system including: plural image forming apparatuses that form images; and a second memory that stores user identification information for identifying a user and apparatus identification information for identifying an image forming apparatus storing image data corresponding to the user identification information so as to be correlated with each other, wherein each of the image forming apparatuses includes a first memory that stores the user identification information and the image data so as to be correlated with each other; a reception component that receives user identification information of a certain user; a first acquisition component that acquires image data stored in the first memory provided in the image forming apparatus identified by the apparatus identification information correlated with the user identification information received by the reception component when the apparatus identification information correlated with the user identification information received by the reception component is stored in the second memory; a second acquisition component that acquires, from other image forming apparatuses which are different from the own image forming apparatus, image data correlated with the user identification information received by the reception component and apparatus identification information for identifying the image forming apparatus storing the acquired image data, when the apparatus identification information correlated with the user identification information received by the reception component is not stored in the second memory, or the image data correlated with the user identification information received by the reception component cannot be acquired by the first acquisition component; a storage controller that stores the apparatus identification information acquired by the second acquisition component and the user identification information received by the reception component in the second memory so as to be correlated with each other; and an image forming component that forms an image corresponding to the image data acquired by the first acquisition component or the second acquisition component.

BRIEF DESCRIPTION OF THE DRAWINGS

Exemplary embodiments of the present invention will be described in detail based on the following figures, wherein:

FIG. 4 is a diagram illustrating printing data;

FIG. 6 is a diagram illustrating authentication information;

FIG. 10 is a diagram illustrating updated authentication information.

DETAILED DESCRIPTION

Exemplary Embodiment

Hereinafter, exemplary embodiments of the invention will be described with reference to the drawings.

Configuration

Figure 1:
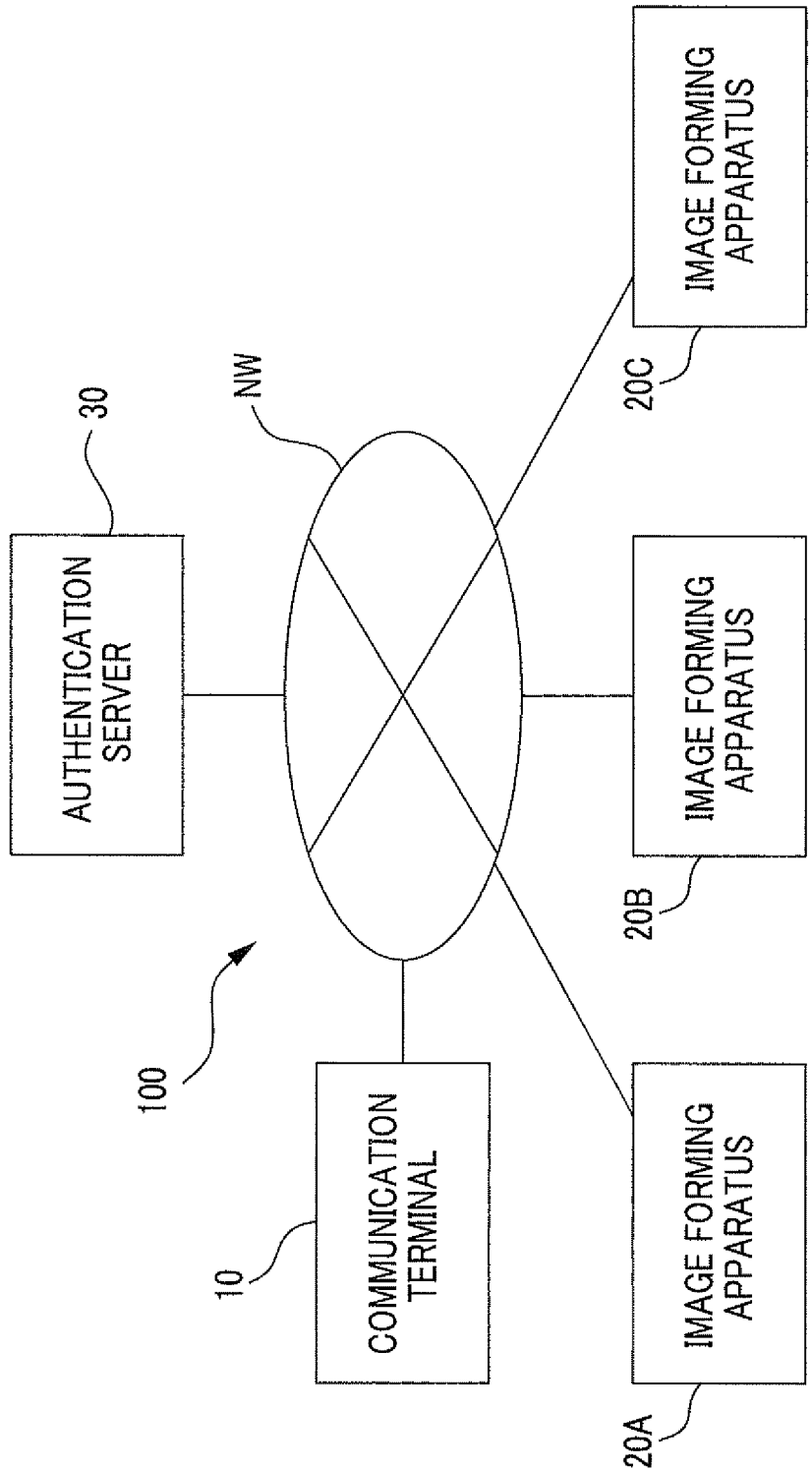
FIG. 1 is a block diagram illustrating a configuration of the image forming system.

FIG. 1 is a block diagram illustrating a configuration of the image forming system 100 according to an exemplary embodiment of the invention. The image forming system 100 includes a communication terminal 10, image forming apparatuses 20A, 20B and 20C, an authentication server 30, and a network NW. In a case where it is not necessary to differentiate the configurations of the image forming apparatuses 20A, 20B and 20C from each other, the letters added to the ends of the reference numerals are omitted, and the apparatuses are simply referred to as an image forming apparatus 20 or image forming apparatuses 20. In addition, the number of the image forming apparatuses 20 and the communication terminal 10 is not limited to that shown in FIG. 1. The network NW is a communication network including a mobile communication network such as, for example, a portable telephone network or a wireless LAN (Local Area Network), or a fixed communication network such as the Internet.

The communication terminal 10 is a communication terminal which may communicate with the image forming apparatus 20, such as, for example, a mobile phone, a wireless terminal which may be connected to a wireless LAN, or a PC (Personal Computer) having a communication function, and a PC is shown as an example in FIG. 1. The image forming apparatus 20 is, for example, an electrophotographic printer. The image forming apparatus 20 includes a storage location which stores printing data transmitted from the communication terminal 10. Here, the printing data is data related to a printing process which is instructed by a user using the communication terminal 10, and includes a user ID for identifying a user, image data which is a printing target, time information, and the like. In addition, the printing here indicates forming an image in an electrophotographic type. The authentication server 30 is a server apparatus which stores a user ID, a password, and information for identifying the image forming apparatus 20 designated as a spooler which is a storage location storing printing data transmitted from the communication terminal 10 of each user, so as to be correlated with each other. The information for identifying the image forming apparatus 20 is, for example, the name, or address information such as an IP (Internet Protocol) address, assigned to each of the image forming apparatuses 20.

Figure 2:
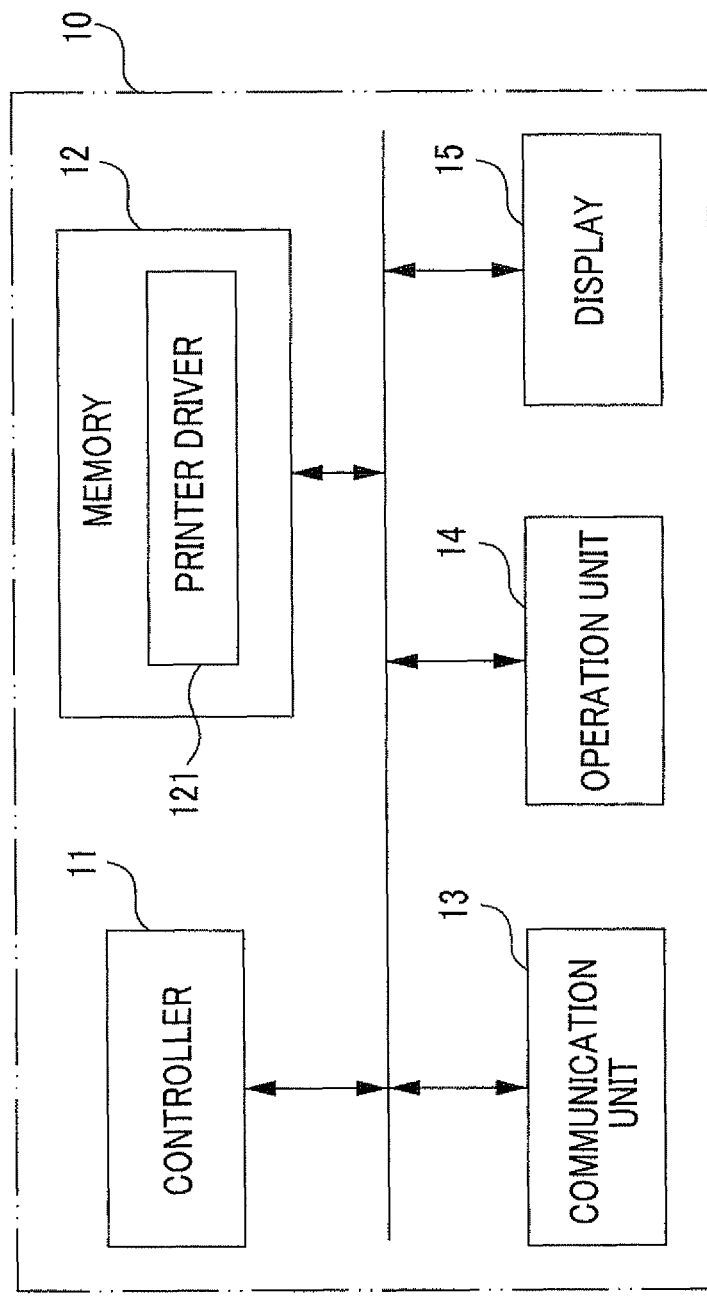
FIG. 2 is a block diagram illustrating a hardware configuration of the communication terminal.

FIG. 2 is a block diagram illustrating a hardware configuration of the communication terminal 10. The communication terminal 10 includes a controller 11, a memory 12, a communication unit 13, an operation unit 14, and a display 15. The above-described elements are electrically connected to each other via a bus. The controller 11 includes a CPU (Central Processing Unit), a ROM (Read Only Memory), and a RAM (Random Access Memory). The CPU controls the above-described elements connected to the controller 11 by executing a control program stored in the ROM or the memory 12. The memory 12 is a storage device such as, for example, a hard disk, and stores, for example, a control program or a printer driver 121. The printer driver 121 is a program having a function of controlling the image forming apparatuses 20.

The communication unit 13 communicates with the image forming apparatus 20 under the control of the controller 11. The operation unit 14 includes a mouse or plural keys receiving a click operation, and supplies a signal according to operation contents to the controller 11 when the mouse or the keys are operated by a user. The controller 11 determines the operation contents and performs a process on the basis of the signal. The display 15 includes a display such as, for example, a liquid crystal display, or a memory such as a VRAM (Video Random Access Memory), and displays a variety of images on the liquid crystal display under the control of the controller 11.

A user ID and spooler information are set in the printer driver 121 so as to be correlated with each other in advance. The spooler information is information indicating a storage location storing printing data transmitted from the communication terminal 10. The spooler information includes address information such as an IP address assigned to each of the image forming apparatuses 20, and the name of each of the image forming apparatuses 20. For example, the user ID "user 01" and the IP address "192.168.227.101" assigned to the image forming apparatus 20A are correlated with each other and are set in the printer driver 121. In addition, the spooler information set in the printer driver 121 may be changed by a user using the operation unit 14.

Figure 3:
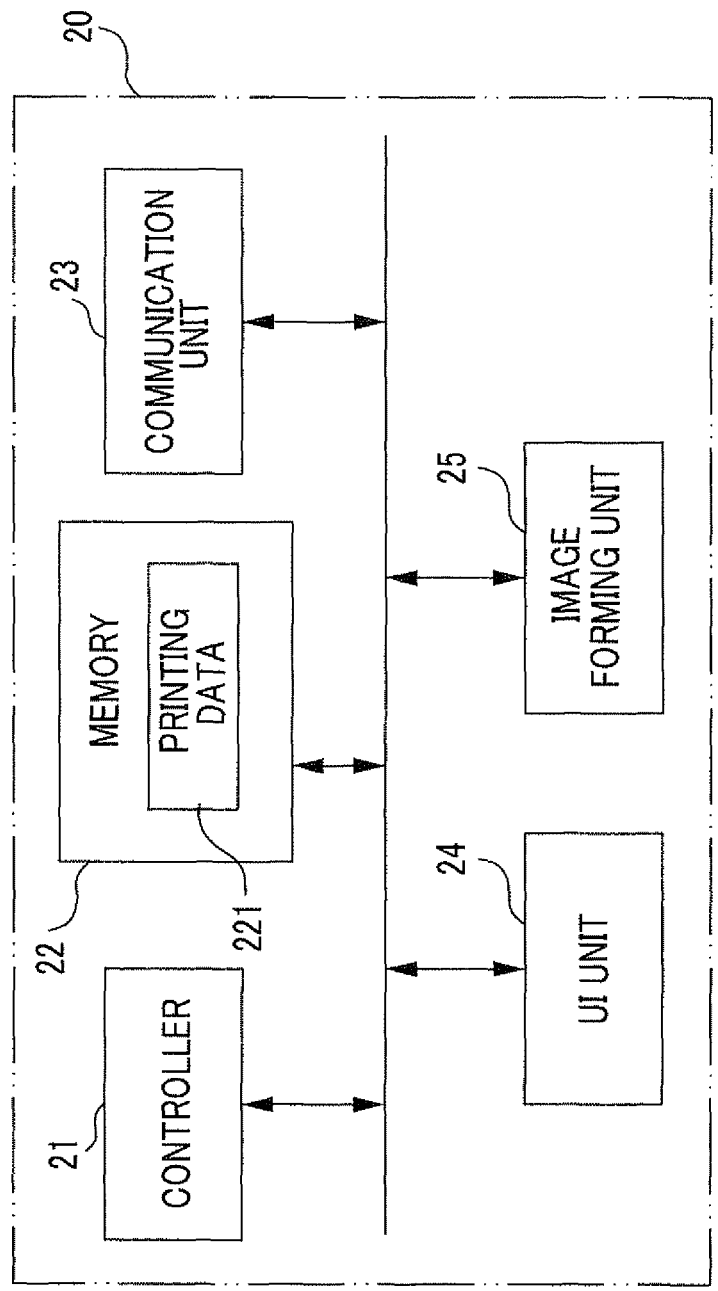
FIG. 3 is a block diagram illustrating a hardware configuration of the image forming apparatus.

FIG. 3 is a block diagram illustrating a hardware configuration of the image forming apparatus 20. The image forming apparatus 20 is constituted by a computer including a controller 21, a memory 22, a communication unit 23, a UI (User Interface) unit 24, and an image forming unit 25. The respective elements are electrically connected to each other via a bus. The controller 21 includes a CPU, a ROM, and a RAM. The CPU controls the above-described elements connected to the controller 21 by executing a control program stored in the ROM or the memory 22. The memory 22 is a storage device such as, for example, a hard disk, and stores, for example, a control program or printing data 221. The printing data 221 is printing data received from the communication terminal 10. The communication unit 23 communicates with the communication terminal 10 and the authentication server 30 under the control of the controller 21. The UI unit 24 includes, for example, a touch screen and keys. The UI unit 24 supplies a signal according to operation contents of a user to the controller 21. The controller 21 determines the operation contents on the basis of the signal, and, for example, performs a printing process or displays an image on the touch screen. The image forming unit 25 is an example of the image forming component which forms an image corresponding to image data on a paper sheet.

FIG. 4 is a diagram illustrating the printing data 221. The printing data 221 includes plural items of "user ID", "storage date", "file name", "number of pages", and "number of copies". The printing data 221 may include, for example, information such as "discrimination of color and monochrome", "whether or not both-side printing is performed", and "kind of post-process" in addition thereto. The "user ID" is a user ID of a user who instructs a printing process in the communication terminal. The "storage date" is time information indicating that printing data is stored in the memory 22, that is, the printing data is stored in the image forming apparatus 20. The "file name" indicates the file name of image data which is a printing target included in printing data. The "number of pages" indicates the number of pages of a file which is a printing target. The "number of copies" indicates the number of copies to be printed. In addition, the printing data includes image data itself which is a printing target indicated by the file name in the "file name". FIG. 4 exemplifies contents of the printing data 221 which is stored in the memory 22C of the image forming apparatus 20C, and shows that three pieces of printing data are stored in the image forming apparatus 20C in relation to the user ID "User 01".

Figure 5:
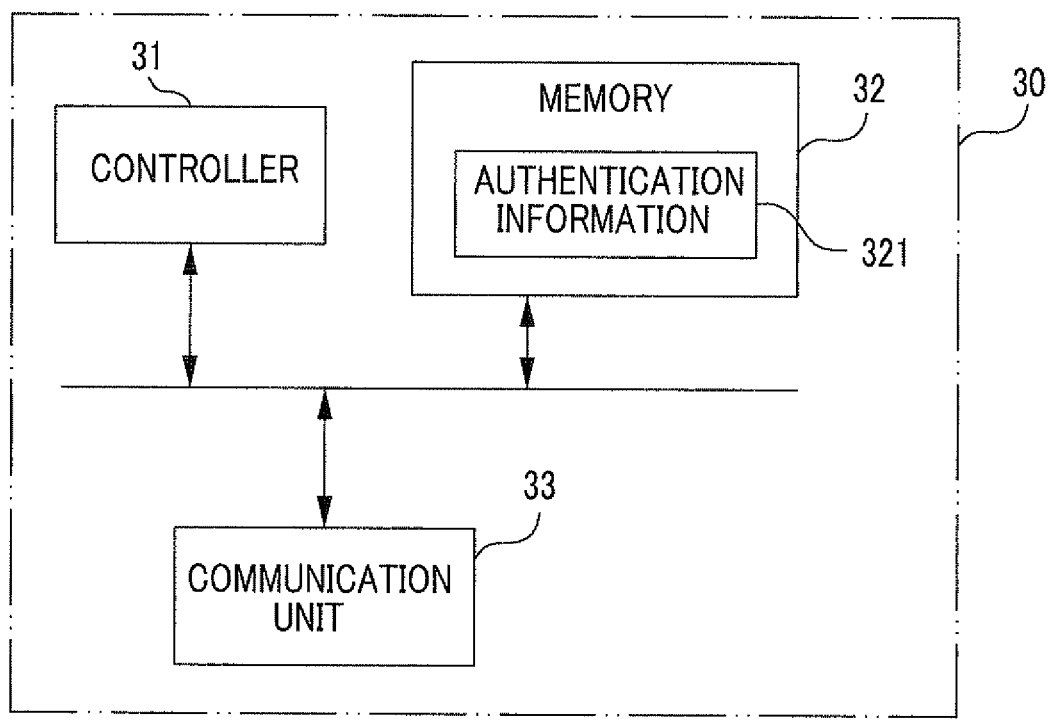
FIG. 5 is a block diagram illustrating a hardware configuration of the authentication server.

FIG. 5 is a block diagram illustrating a hardware configuration of the authentication server 30. The authentication server 30 is constituted by a computer including a controller 31, a memory 32, and a communication unit 33. The above-described elements are electrically connected to each other via a bus. The controller 31 includes a CPU, a ROM, and a RAM. The CPU controls the above-described elements connected to the controller 31 by executing a control program stored in the ROM or the memory 32. The communication unit 33 communicates with the image forming apparatus 20 under the control of the controller 31. The memory 32 is a storage device such as, for example, a hard disk, and stores, for example, a control program or authentication information 321.

FIG. 6 is a diagram illustrating the authentication information 321. The authentication information 321 includes plural items of "user ID", "password" and "spooler information". The "user ID" is as described above. The "password" is a combination of characters defined by letters, figures or symbols for obtaining authentication when a user assigned with a user ID uses the image forming apparatus 20 in the image forming system 100. The user tries authentication by inputting the user ID and the password by the use of the UI unit 24 in the image forming apparatus 20. The "spooler information" indicates a spooler which is a storage location storing printing data transmitted from the communication terminal 10 of each user, prior to contents set by the printer driver 121. The spooler information describes the "primary" spooler having the highest priority and the "secondary" spooler having the highest priority next to the primary spooler. For example, in a case where communication with the image forming apparatus 20 set as a primary spooler is not performed due to a failure of the network NW, printing data is stored in the image forming apparatus 20 set as a secondary spooler. In addition, in FIG. 6, "192.168.227.101" indicates an IP address assigned to the image forming apparatus 20A, "192.168.227.102" indicates an IP address assigned to the image forming apparatus 20B, and "192.168.227.103" indicates an IP address assigned to the image forming apparatus 200. An administrator is assigned to the authentication server 30, and the administrator manages the authentication information 321. For example, in a case where a new user participates in as a user of the image forming system 100, the administrator sets spooler information as authentication information of the user.

Figure 7:
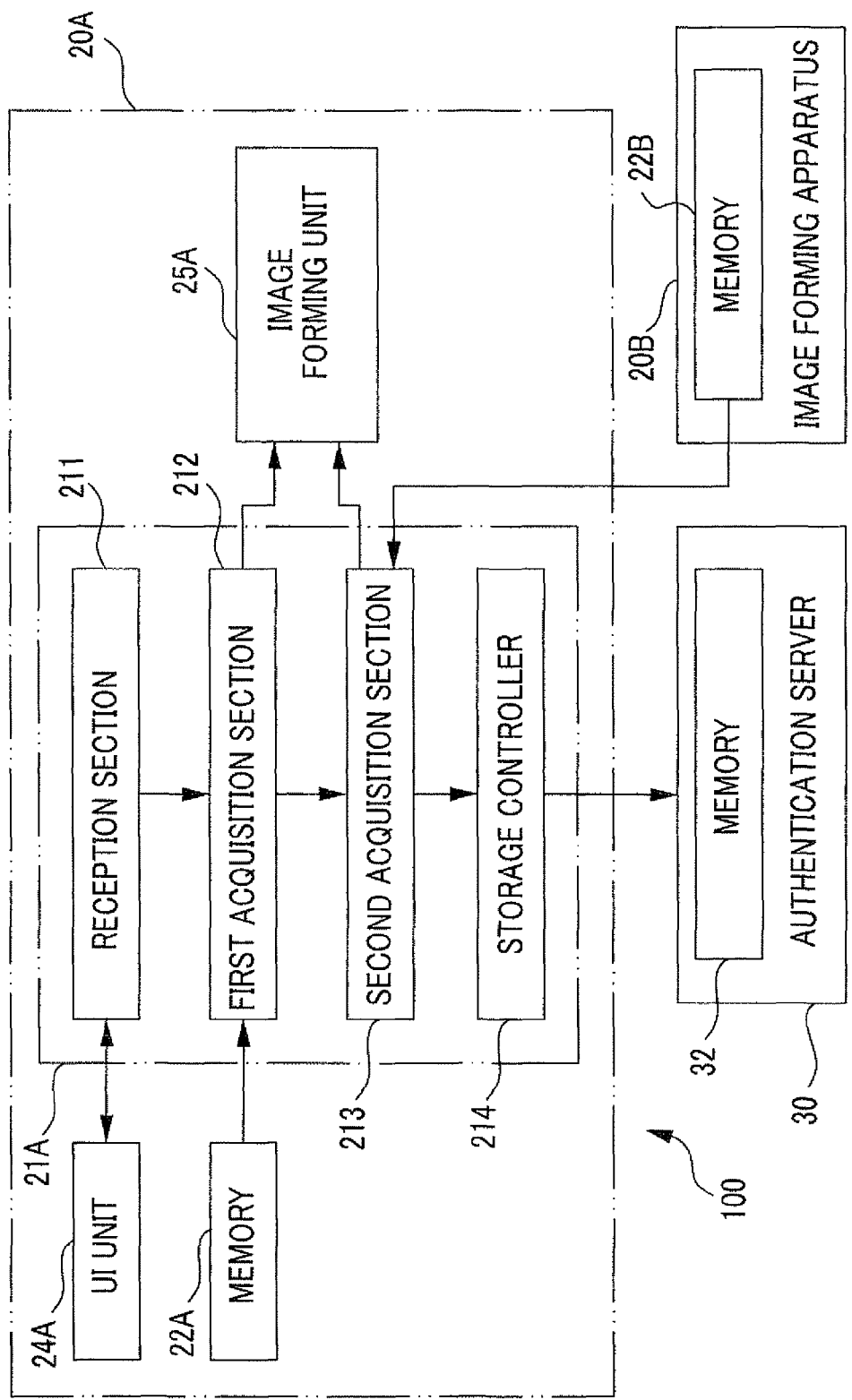
FIG. 7 is a block diagram illustrating a functional configuration of the image forming system.

FIG. 7 is a block diagram illustrating a functional configuration of the image forming system 100. In FIG. 7, though the reference numerals 20A and 20B are used in order to show two different image forming apparatuses 20, each of them is not limited to a specific image forming apparatus 20. The memory 32 included in the authentication server 30 is an example of the second memory which stores user identification information for identifying a user and apparatus identification information for identifying the image forming apparatus 20 storing image data corresponding to the user identification information so as to be correlated with each other. The memories 22A and 22B are an example of the first storage component which stores user identification information for identifying a user and image data indicating an image so as to be correlated with each other. A reception section 211 realized by the controller 21 functions as an example of the reception component receiving an input of user identification information of a certain user in cooperation with the UI unit 24. A first acquisition section 212 realized by the controller 21A is an example of the first acquisition component which acquires image data stored in the memory 22 included in the image forming apparatus 20 identified by apparatus identification information and correlated with user identification information in a case where the apparatus identification information correlated with the user identification information received by the reception component is stored in the memory 32. A second acquisition section 213 realized by the controller 21A is an example of the second acquisition component which acquires image data and apparatus identification information for identifying an image forming apparatus from other image forming apparatuses 20 different from the own apparatus, storing the image data correlated with the user identification information received by the reception component in the memories 22, in a case where apparatus identification information correlated with the user identification information received by the reception component is not stored in the memory 32, or the image data cannot be obtained by the first acquisition section 212. A storage controller 214 realized by the controller 21A is an example of the storage control component which stores apparatus identification information acquired by the second acquisition section 213 and user identification information received by the reception component in the memory 32 so as to be correlated with each other. The image forming unit 25A is an example of the image forming component which forms an image corresponding to image data acquired by the first acquisition section 212 or the second acquisition section 213.

Figure 8:
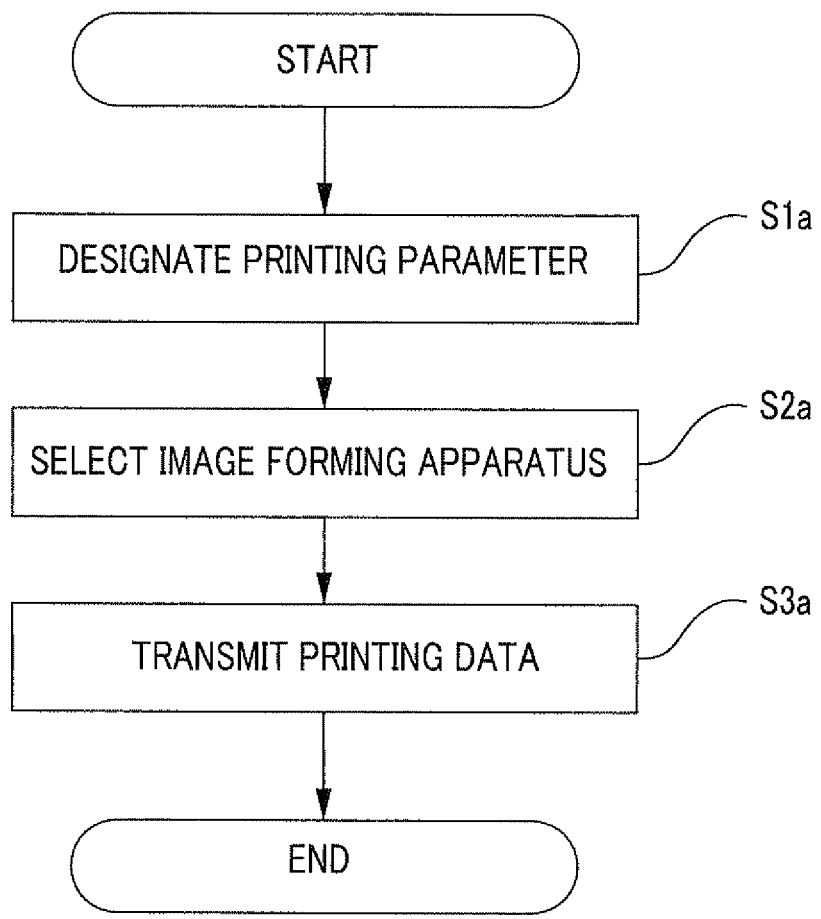
FIG. 8 is a flowchart illustrating an operation of the image forming system.

FIG. 8 is a flowchart illustrating an operation of the image forming system 100, and shows a process performed by the communication terminal 10. In the following description of the flowchart, a "user" indicates a user having the user ID "User 01". First, the user designates a parameter regarding printing such as, for example, the number of pages or the number of copies using the operation unit 14 when performing a printing instruction using the communication terminal 10 (step S1a). Next, the user selects the image forming apparatus 20 performing printing, for example, according to contents displayed on the display 15 using the operation unit 14 (step S2a). Here, for example, the image forming apparatus 20 set as a spooler in the printer driver 121 is selected in advance by the controller 11 as an initial value in a state of not being selected by the user. In addition, the controller 11 of the communication terminal 10 transmits printing data based on the instruction to the image forming apparatus 20 selected in step S2a using the communication unit 13 (step S3a). Here, a transmission destination is assumed as the image forming apparatus 20C. The controller 21C of the image forming apparatus 20C receives the printing data, and stores the received printing data in the memory 22C as printing data 221. As a result, as shown in FIG. 4, the printing data 221 stored in the memory 22C of the image forming apparatus 20C includes three pieces of printing data for the user ID "User 01".

Figure 9:
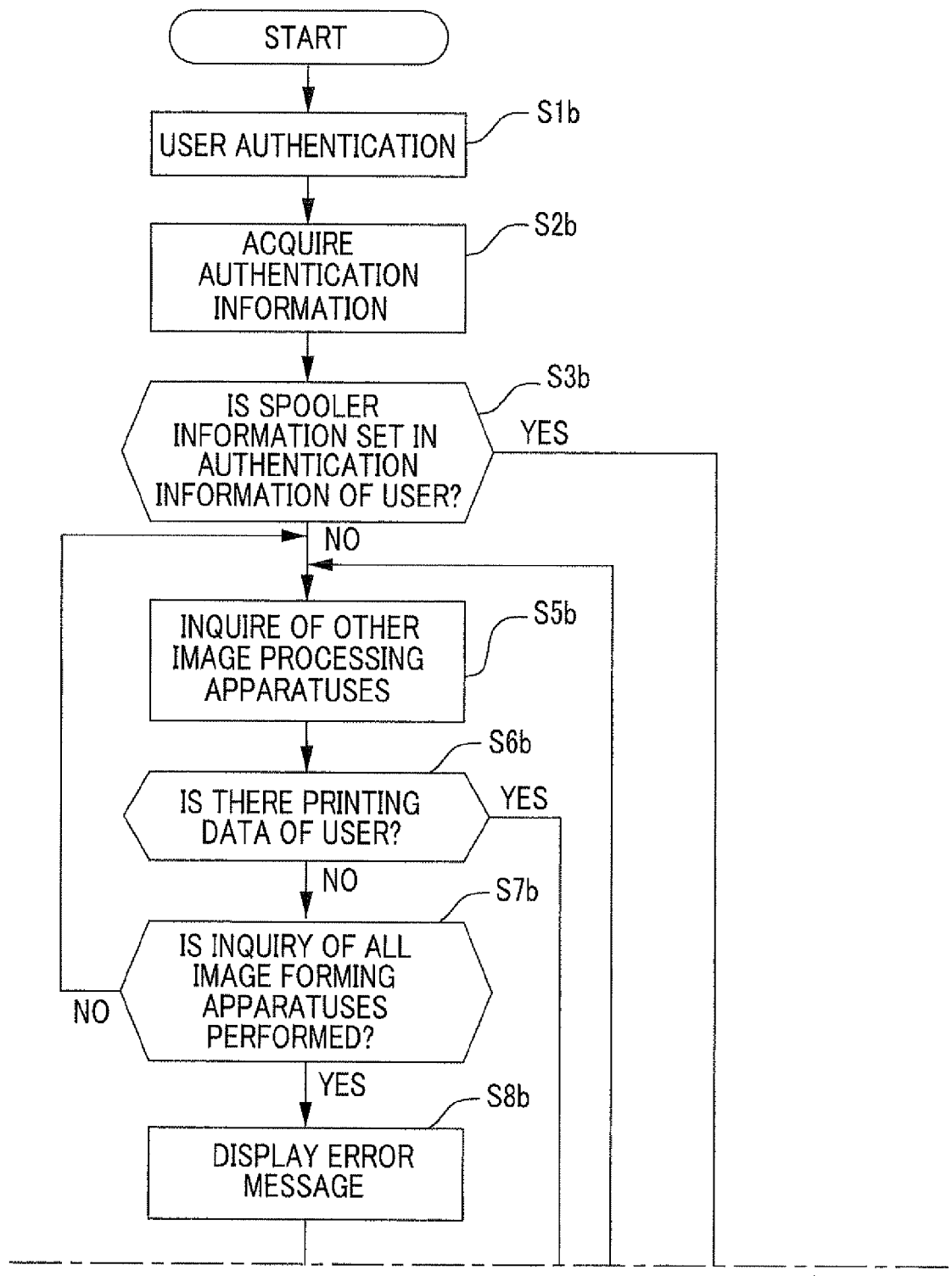
FIG. 9 is a flowchart illustrating an operation of the image forming system.

Next, it is assumed that the user moves from a position of the communication terminal 10 to a position of the image forming apparatus 20A and performs printing based on the printing data using the image forming apparatus 20A. FIG. 9 is a flowchart illustrating an operation of the image forming system 100 and shows a process performed by the image forming apparatus 20A. The user inputs the user ID and the password using the UI unit 24A, and performs user authentication in the image forming apparatus 20A (step S1b). If the user authentication is completed, the controller 21A of the image forming apparatus 20A stores the authenticated user ID in the RAM. Next, the controller 21A transmits an instruction for searching for the authentication information 321 using the authenticated user ID as a key to the authentication server 30 by the use of the communication unit 23A, and receives authentication information as a result of the search (step S2b).

Next, the controller 21A determines whether or not spooler information correlated with the authenticated user is set in the authentication information acquired in step S2b (step S3b). In a case where spooler information is not set (step S3b; No), the flow proceeds to step S5b where the controller 21A performs a process. Here, as shown in FIG. 6, it is assumed that the image forming apparatus 20A of which the IP address is "192.168.227.101" is set as a primary spooler in the user ID "User 01". That is to say, since the spooler information is set (step S3b; Yes), the controller 21A determines whether or not the printing data of the user is stored in the set spooler (step S4b). Here, since an image forming apparatus set as the spooler is the image forming apparatus 20A under operation, specifically, in step S4b, the controller 21A searches for the printing data 221 stored in the memory 22A using the user ID "User 01" as a key. Here, it is assumed that there is no data correlated with the user ID "User 01" in the printing data 221 stored in the memory 22A.

In a case where printing data of the authenticated user is stored in the spooler set in the authentication information (step S4b; Yes), the controller 21A acquires the printing data of the authenticated user from the spooler (step S10b). Specifically, in step S10b, in a case where the image forming apparatus 20A operated by the user is the same as the spooler, the controller 21A reads printing data correlated with the user ID "User 01" of the printing data 221 stored in the memory 22A of the image forming apparatus 20A under operation. On the other hand, in step S10b, in a case where the image forming apparatus 20A operated by the user is different from the spooler, the controller 21A instructs the image forming apparatus 20 which is the spooler to search for the printing data 221 using the user ID "User 01" as a key. The controller 21 of the age forming apparatus 20 which receives the instruction using the communication unit 23 transmits printing data correlated with the user ID "User 01" of the printing data 221 stored in the memory 22, to the image forming apparatus 20A using the communication unit 23. The controller 21A receives the printing data using the communication unit 23A.

After step S10b, the controller 21A displays information indicating the acquired printing data on the UI unit 24A, for example, in the list form (step S11b). The information indicating printing data includes, for example, the file name, the number of pages, the number of copies, the name for identifying the image forming apparatus 20 which is a storage location of printing data, and an IP address. Next, when the user selects printing data which is to be printed from the list using the UI unit 24A, the controller 21A specifies the selected printing data (step S12b). In addition, the controller 21A performs printing using the image forming unit 25A on the basis of the specified printing data (step S13b).

On the other hand, in a case where the printing data of the authenticated user is not stored in the spooler set in the authentication information (step S4b; No), the controller 21A transmits an inquiry about whether or not the printing data of the user is stored, to the other image forming apparatuses 20 different from the own apparatus using the communication unit 23A (step S5b). Specifically, in step S5b, the controller 21A transmits an inquiry about whether or not the printing data correlated with the user ID "User 01" is stored, to other image forming apparatuses 20 different from the own apparatus, for example, present in the subnet mask common to the own apparatus. The controller 21 of the image forming apparatus 20 which receives the inquiry using the communication unit 23 transmits the user ID (User 01), the IP address of this image forming apparatus 20, and an affirmative response to the image forming apparatus 20A using the communication unit 23, in a case where the printing data correlated with the user ID "User 01" is stored in the memory 22. On the other hand, in a case where the printing data correlated with the user ID "User 01" is not stored in the memory 22, the controller 21 transmits a negative response to the image forming apparatus 20A using the communication unit 23.

If all the received responses are negative (step S6b; No), the controller 21A determines whether or not to receive responses to inquiries from all the other image forming apparatuses 20 different from the own apparatus, for example, present in the subnet mask common to the own apparatus (step S7b). The determination in step S7b is performed using, for example, an inquiry list stored in the RAM by the controller 21A. The inquiry list describes sets of IP addresses of all the other image forming apparatuses 20 different from the own apparatus, present in the subnet mask common to the own apparatus, and reception flags indicating whether or not responses to inquiries are received. In a case where responses to inquiries are received from all the other image forming apparatuses 20 (step S7b; Yes), the controller 21A displays an error message "there is no corresponding to printing data of the user" on the UI unit 24 (step S8b), and finishes the process shown in FIG. 9. On the other hand, in a case where responses to inquiries are not received from all the other image forming apparatuses 20 (step S7b; No), the flow returns to step S5b where the controller 21A performs the process.

On the other hand, in a case where the received responses include an affirmative response (step S6b; Yes), the controller 21A instructs the authentication server 30 to update the authentication information 321 using the IP address and and the user ID "User 01" which are received along with the affirmative response in step S5b (step S9b). The controller 31 of the authentication server 30 which receives the instruction using the communication unit 33 updates the spooler information of the authentication information correlated with the received user ID in the authentication information 321, using the received IP address. Here, it is assumed that the IP address received along with the affirmative response in step S6b is "192.168.227.103". As shown in FIG. 6, secondary spooler information of the user ID "User 01" is not set, and thus the controller 31 describes "192.168.227.103" in the spooler information so as to be stored in the memory 32. FIG. 10 is a diagram illustrating the updated authentication information 321. As maybe seen upon comparison with FIG. 6, the secondary spooler information of the user ID "User 01" is set in the updated authentication information 321. A method of updating the authentication information 321 is not limited to the above-described contents, and, for example, the primary spooler information of the user ID "User 01" may be rewritten to "192.168.227.103" in this example. At this time, the same contents as set in the original primary spooler information may be described in the secondary spooler information.

The description is made with reference to FIG. 9 again. Next, the controller 21A transmits an instruction for searching for printing data using the user ID "User 01" as a key to the image forming apparatus 20C which is a spooler (step S10b). The controller 21C of the image forming apparatus 20C which receives the instruction using the communication unit 23C transmits printing data correlated with the user ID "User 01" of printing data stored in the memory 22C, to the image forming apparatus 20A using the communication unit 23C. The controller 21A receives the printing data using the communication unit 23A. Thereafter, the processes in steps S11b to S13b described above are performed.

According to the exemplary embodiment, if the spooler information of the authenticated user is set in the authentication information 321, and printing data of the user is stored in the image forming apparatus 20 set as a spooler, the controller 21 acquires image data from the spooler. On the other hand, if the spooler information of the authenticated user is not set in the authentication information 321, or the spooler information of the authenticated user is set in the authentication information 321 but printing data of the user is not stored in the image forming apparatus 20 set as a spooler, the controller 21 transmits an inquiry to other image forming apparatuses 20. When a response indicating that printing data of the authenticated user is stored is made to the inquiry, the controller 21 sets the image forming apparatus 20 which transmits the response in the spooler information so as to update the authentication information 321. At this time, even if a user of which spooler information is not set in the authentication information 321, in a case where there is the image forming apparatus 20 storing printing data of the user, spooler information is set and then authentication information 321 is updated without operations of the user and the administrator of the authentication server 30. In addition, for example, in a case where a certain user wants to set an image forming apparatus 20 different from that set hitherto as a spooler, when the user designates the image forming apparatus 20 and instructs printing, the designated image forming apparatus 20 is set as a spooler if printing data of the user does not exist in a spooler which is set until then. Thereby, for example, in a case where the user' s seat is changed in an office and wants to set an image forming apparatus 20 located near the changed user's seat as a spooler, the user may designate the image forming apparatus 20 and instruct printing.

As such, according to the exemplary embodiment, as compared with a case where a user performs registration and update of correlation between user identification information for identifying a user and a storage location of image data corresponding to the user, it is possible to save the user inconvenience in registration or update of correlation between the user and the storage location of image data corresponding to the user in a case where the user forms an image designated by the user in any of plural image forming apparatuses.

MODIFIED EXAMPLES

The above-described exemplary embodiment may be modified as follows. In addition, the following modified examples may be appropriately implemented in combination with each other.

Modified Example 1

The image forming system 100 may not include the authentication server 30, and the authentication information 321 may be stored in each of the memories 22 of the image forming apparatuses 20. In this case, the controller 21 of the image forming apparatus 20 acquires the authentication information 321 stored in the memory 22 of the own apparatus in step S2b. In addition, in this case, the controller 21 of the image forming apparatus 20 updates the authentication information 321 stored in the memory 22 of the own apparatus in step S9b.

In addition, since the authentication information 321 is stored in the plural image forming apparatuses 20, there is a problem in that there is possibility that the identity of the authentication information 321 is not present in the entire image forming system 100, but this may be treated as follows. For example, the controller 21 of the image forming apparatus 20 where the authentication information 321 is updated transmits the authentication information 321 stored in the own apparatus to another image forming apparatus 20 using the communication unit 23 at a predefined timing. The controller 21 of another image forming apparatus 20 which receives the authentication information using the communication unit 23 updates the authentication information 321 stored in the memory 22 to the received contents. The predefined timing may be set on the basis of a time interval such as, for example, every thirty minutes or one hour, or may be set to time included in a specific time zone such as the lunch break or the midnight.

According to the modified example 1, the authentication server 30 is not used, and thereby a configuration of the image forming system 100 may be simplified and the same effects as in the exemplary embodiment may be achieved.

Modified Example 2

In step S5b, the image forming apparatus 20 which is a transmission destination of the inquiry is not limited to being present in the subnet mask common to the own apparatus, and may be as follows. For example, in a case where IP addresses of other image forming apparatuses 20 capable of communicating with the own apparatus are stored in the memory 22A of the image forming apparatus 20A, the controller 21A transmits an inquiry to the image forming apparatus 20 assigned with the IP addresses stored therein using the communication unit 23A. In addition, for example, the inquiry may be transmitted to other image forming apparatuses 20 different from the own apparatus, present on the network NW, by using an SLP (Service Location Protocol) or Zeroconf (Zero Configuration Networking) as a communication protocol. In this way as well, the same effects as in the exemplary embodiment may be achieved.

Modified Example 3

When spooler information in the authentication information 321 is updated by the controller 21A, in a case where the set spooler is temporarily used by the user, the user has a trouble in designating another image forming apparatus 20 which is normally used and performing a printing instruction again. This may be treated as follows. In the modified example 3, the user may set On and Off states of a count mode which is a mode regarding whether or not the number of notifications indicating that printing data of the user is stored is counted, for each of the image forming apparatuses which are not set in spooler information in the authentication information 321, by the use of the (ii unit 24. In addition, in the modified example 3, the controller 21A stores a number list where the IP addresses received along with the affirmative response in step S5b are correlated with the number of affirmative responses from the IP addresses, that is, notifications to be received, in the memory 22A for each of the user IDs. Here, an initial value of the number of affirmative responses received from the respective IP addresses is, for example, 0.

In the modified example 3, the responses received in step S5b include an affirmative response (step S6b; Yes), and, the flow proceeds to step S9b where the controller 21A performs a process in a case where the count mode is in an Off state. On the other hand, in a case where the count mode is an On state at the above-described timing, the controller 21A adds a predetermined value (here, "1") to the number of affirmative responses received from the image forming apparatus 20 of the IP address received in step S5b in the number list of the authenticated user ID, and the flow proceeds to step S9b. In step S9b according to the modified example 3, the controller 21A determines whether or not there is an IP address where the number of received affirmative responses is equal to or more than a predefined threshold value (for example, "3") in the number list of the authenticated user ID. In a case where such an IP address is not described in the number list, the flow proceeds to step S10b where the controller 21A performs a process without transmitting an instruction for updating the authentication information 321 to the authentication server 30. On the other hand, in a case where such an IP address is described in the number list, the controller 21A instructs the authentication server 30 to update the authentication information 321 using the IP address and the user ID of the authenticated user. The controller 31 of the authentication server 30 which receives the instruction using the communication unit 33 updates spooler information of the authentication information correlated with the received user ID in the authentication information 321 using the received IP address. In addition, the processes after step S10b are performed. The controller 21A initializes (here, "0") the number of affirmative responses received from the image forming apparatus 20 of each IP address described in the number list at a predefined timing such as, for example, every day or every week.

According to the modified example 3, since the image forming apparatus 20 which is only used temporarily is not likely to be set as a spooler in the authentication information 321, it is possible to save the user inconvenience in setting a spooler normally used again even if the user temporarily performs printing using other image forming apparatuses 20.

Modified Example 4

In addition, the exemplary embodiment of the invention may be specified as a program for enabling a computer to function as a controller. Such a program may be provided in a form of being recorded on a recording medium such as an optical disc, or may be provided in a form of being downloaded to and installed in the computer via a communication line such as the Internet, and being used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the.invention be defined by the following claims and their equivalents.

What is claimed is:

1. An image forming system comprising:
a plurality of image forming apparatuses that form images; and
a second memory on a device that is different from the plurality of image forming apparatuses that stores user identification information for identifying a user and apparatus identification information for identifying an image forming apparatus storing image data corresponding to the user identification information so as to be correlated with each other,
wherein each of the image forming apparatuses includes:
a first memory that stores the user identification information and the image data so as to be correlated with each other;
a reception component that receives user identification information of a certain user;
a first acquisition component that acquires image data stored in the first memory provided in the image forming apparatus identified by the apparatus identification information correlated with the user identification information received by the reception component when the apparatus identification information correlated with the user identification information received by the reception component is stored in the second memory;
an inquiry unit that inquires of all the plurality of image forming apparatuses to determine a subset of image forming apparatuses that have image data corresponding to the user identification information;
a second acquisition component that acquires, from the subset of image forming apparatuses which is different from an own image forming apparatus, image data correlated with the user identification information received by the reception component and apparatus identification information for identifying the image forming apparatus storing the acquired image data, in response to a determination that the apparatus identification information correlated with the user identification information received by the reception component is not stored in the second memory;
a storage controller that stores the apparatus identification information acquired by the second acquisition component and the user identification information received by the reception component in the second memory so as to be correlated with each other; and
an image forming component that forms an image corresponding to the image data acquired by the first acquisition component or the second acquisition component.

2. The image forming system according to claim 1,
wherein each of the image forming apparatuses further includes an inquiry component that inquires of an image forming apparatus indicated by the apparatus identification information acquired by the second acquisition component about whether or not image data correlated with the user identification information received by the reception component is stored in the first memory provided in the image forming apparatus,
wherein the storage controller stores the apparatus identification information indicating the image forming apparatus which is an inquiry destination and the user identification information received by the reception component in the second memory so as to be correlated with each other, when number of responses indicating that the image data is stored in the first memory in response to the inquiry is equal to or more than a threshold value.

3. An image forming apparatus comprising:
a first memory that stores user identification information for identifying a user and image data so as to be correlated with each other;
a reception component that receives user identification information of a certain user;
a second memory on a device that is different from the image forming apparatus that stores the user identification information and apparatus identification information for identifying an image forming apparatus storing image data corresponding to the user identification information so as to be correlated with each other,
a first acquisition component that acquires image data stored in the first memory provided in the image forming apparatus identified by the apparatus identification information correlated with the user identification information received by the reception component when the apparatus identification information correlated with the user identification information received by the reception component is stored in the second memory;
an inquiry unit that inquires of all a plurality of image forming apparatuses to determine a subset of image forming apparatuses that have image data corresponding to the user identification information;
a second acquisition component that acquires, from the subset of image forming apparatuses which is different from an own apparatus, image data correlated with the user identification information received by the reception component and apparatus identification information for identifying the image forming apparatus storing the acquired image data, in response to a determination that the apparatus identification information correlated with the user identification information received by the reception component is not stored in the second memory;
a storage controller that stores the apparatus identification information acquired by the second acquisition component and the user identification information received by the reception component in the second memory so as to be correlated with each other; and
an image forming component that forms an image corresponding to the image data acquired by the first acquisition component or the second acquisition component.

4. A non-transitory computer readable medium storing a program causing a computer to function as:
a first memory on a plurality of image forming apparatus, the first memory storing user identification information for identifying a user and image data so as to be correlated with each other;
a reception component that receives user identification information of a certain user;
a second memory, on a device that is different from a device on which the first memory is located, that stores the user identification information and apparatus identification information for identifying an image forming apparatus storing image data corresponding to the user identification information so as to be correlated with each other;
a first acquisition component that acquires image data stored in the first memory provided in the image forming apparatus identified by the apparatus identification information correlated with the user identification information received by the reception component when the apparatus identification information correlated with the user identification information received by the reception component is stored in the second memory;
an inquiry unit that inquires of all of the plurality of image forming apparatuses to determine a subset of image forming apparatuses that have image data corresponding to the user identification information;

a second acquisition component that acquires, from the subset of image forming apparatuses which is different from an own apparatus, image data correlated with the user identification information received by the reception component and apparatus identification information for identifying the image forming apparatus storing the acquired image data, in response to a determination that the apparatus identification information correlated with the user identification information received by the reception component is not stored in the second memory;

a storage controller that stores the apparatus identification information acquired by the second acquisition component and the user identification information received by the reception component in the second memory so as to be correlated with each other; and an output component that outputs the image data acquired by the first acquisition component or the second acquisition component to an image forming component which forms an image corresponding to the image data.

* * * * *